Patented Nov. 15, 1932

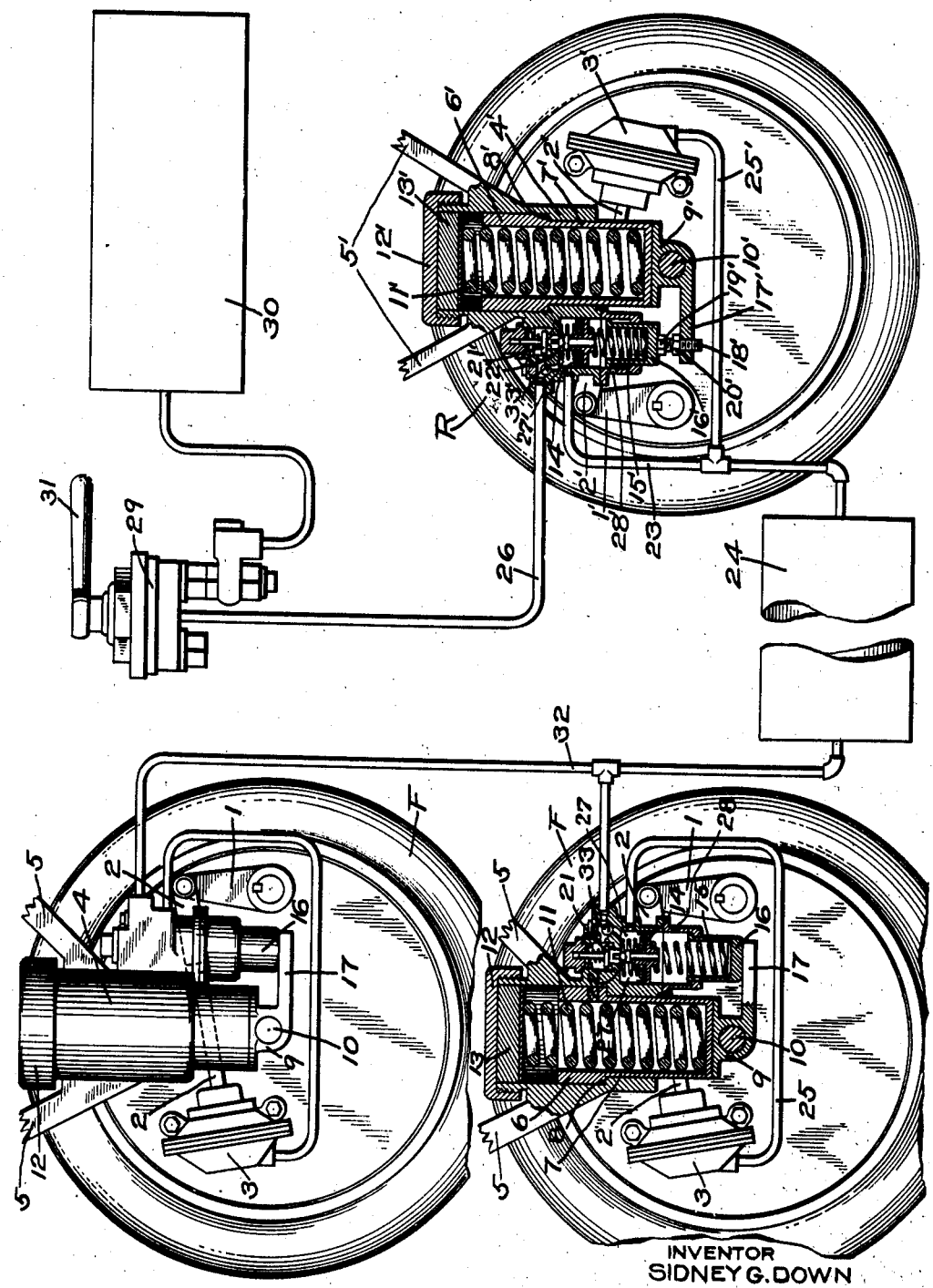

1,887,583

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AIRPLANE BRAKE

Application filed November 13, 1928. Serial No. 319,137.

This invention relates to brakes, and more particularly to a fluid pressure brake for airplanes.

My invention has special reference to means for applying the brakes on the landing wheels, such as two front wheels and a rear wheel or skid.

One object of my invention is to provide an airplane brake in which the braking force applied to each landing wheel is regulated according to the pressure of the wheel on the ground.

Another object of my invention is to provide an airplane brake in which the brakes on the front wheels will not be applied unless the rear wheel or skid engages the ground. If the brakes should be applied to the front wheels when grounded, while the rear wheel is not firmly on the ground, there is danger that the airplane may be turned over.

Another object of my invention is to provide an airplane brake in which the brakes are automatically applied upon a landing wheel touching the ground.

Another object is to provide an airplane brake, in which the brake on a landing wheel is automatically applied upon touching the ground and is automatically released when the wheel leaves the ground.

Another object is to provide an airplane brake, in which the brakes on the front wheels cannot be applied with greater pressure than the brake on the rear wheel.

Other objects and advantages will appear in the following more detailed description of the invention.

In the accompanying drawing, the single figure is a diagrammatic view, partly in section, of an airplane brake apparatus embodying my invention.

F—F represents the usual front landing wheels of an airplane and R the usual rear wheel. Associated with each landing wheel is a brake applying mechanism of any desired type, such as the well known automotive drum and shoe type, having a cam adapted to be operated by a lever for expanding or contracting the brake shoes or brake bands into engagement with the brake drum. This part of the brake being well known, is not shown in the drawing, it being understood that the rocking of a lever 1 associated with the braking mechanism causes the application of the brakes.

The lever or arm 1 is operatively connected to the stem 2 of a diaphragm brake chamber 3 or other brake cylinder, so that by supplying fluid under pressure to the brake chamber, the arm 1 is rocked to apply the brake, and when fluid is released from the brake chamber, the brake is released.

The brake controlling mechanism for the rear wheel may comprise a casing 4' carried by the rear wheel supports 5'. Mounted in a cylindrical bore of the casing is hollow cylindrical plunger 6' having a reduced cylindrical section 7' forming a shoulder 8', which is adapted to engage a corresponding shoulder formed in the casing 4'. The closed lower end of the plunger engages a member 9', which is mounted on the wheel axle 10'.

A coil spring 11' is mounted within the plunger 6' and is held in place by a cover plate 12' having screw-threaded engagement in the casing 4', so that relative movement between the airplane body and the wheel is opposed by the compression of the spring. A rubber pad 13' may be interposed between the upper end of the spring 11' and the cover plate 12'.

In the casing 4' adjacent to the bore containing the plunger 6' is provided a cylindrical bore containing a piston 14', subject on one side to the pressure of a coil spring 15'. Said spring extends into a hollow cylindrical member 16' and the member 9' carries an arm 17' adapted to position the member 16'. In order to regulate the spacing between the member 16' and the arm 17' a bolt 18 having screw-threaded engagement in the arm, has its head 19 engaging the member 16 and carries a jam nut 20 for locking the bolt in its adjusted position.

A fluid pressure supply valve 21' has an integral stem to which is secured an exhaust valve 22' and the exhaust valve is adapted to seat on a valve seat carried by the piston 14'. The chamber 27' above piston 14' is connected to a pipe 23 which leads to a reservoir 24 and said pipe also connects with a pipe 25 leading to the brake chamber 3'.

The unseating of supply valve 21' connects pipe 26 with chamber 27' and when the exhaust valve 22' is unseated, the chamber 27' is connected through a passage in the piston 14' with the chamber at the opposite side of the piston, which is open to the atmosphere through a port 28'.

A brake valve device 29 of any desired type is adapted to be manually operated to control the supply of fluid under pressure from a storage reservoir 30 to pipe 26, or the release of fluid under pressure from said pipe.

The control valve mechanism associated with each of the front wheels is substantially similar to that above described and the same reference numerals with the prime marks omitted are applied to corresponding parts of the control valve mechanisms employed at the front wheels.

In operation, when the airplane is about to land, the operator may apply the brakes by operating the brake valve handle 31, so as to admit fluid under pressure from the reservoir 30 to pipe 26. On the rear wheel R, the parts of the controlling valve mechanism are so disposed that the spring 11' is under initial compression, when the rear wheel is free from the ground. The casing 4' is held against relative upward movement with respect to the plunger 6' by the engagement of the shoulder 8' with a corresponding shoulder of the casing 4', so that the member 16' may be positioned to hold the spring 15' in such a position, according to the adjustment of the bolt 18, that the piston 14' will be held in a position to unseat the valve 21', while the exhaust valve 22' is held seated on the piston. The supply valve 21' is thus initially open and as a consequence, when fluid under pressure is supplied to pipe 26, it flows past the open valve 21' to chamber 27' and thence through pipe 23 to pipe 25' and the brake chamber 3' on the rear wheel, so that the brake is applied on the rear wheel.

The pipe 23 being connected to the reservoir 24, fluid under pressure is also supplied to the reservoir 24, which is connected to a supply pipe 32, which pipe leads to the controlling valve devices of the front wheels F—F. At the rear wheel, when the fluid pressure in the chamber 27' has been increased to a degree slightly in excess of the pressure of spring 15', the piston 14' will be moved downwardly, until the supply valve 21' has been moved to its seat.

The brake chamber 3' at the rear wheel is thus charged with fluid at a predetermined pressure, as determined by the spring 15' and the reservoir 24 is also charged to the same pressure. The brakes, however, at the front wheels F—F are not applied, for the reason that the controlling valve devices at the front wheels are so adjusted that the spring 15 of each front wheel valve device does not exert an initial force on the piston 14.

The result is that the supply valve 21 at each front wheel is normally held closed by its corresponding spring so long as the front wheels are off the ground, so that communication is cut off from the supply pipe 32 to chamber 27 and the brake chamber 3.

When the rear wheel hits the ground, the initial braking force as above provided acts to retard rotation of the wheel and in addition, the spring 11' is compressed in proportion to the force with which the wheel strikes the ground and compression of the spring permits relative movement between the wheel axle 10' and the airplane body, so that the member 16' is moved to compress the spring 15' to a corresponding extent. The supply valve 21' is then opened by the upward movement of piston 14' due to the compression of spring 15' and a further supply of fluid under pressure is admitted to pipe 23 and the brake chamber 3' at the rear wheel, as well as to the reservoir 24.

When the front wheels strike the ground, the spring 11 associated with the controlling valve device of each wheel is compressed in proportion to the pressure exerted on the wheel by the airplane body and thus causes a relative movement between the airplane body and the wheel axle, so that the spring 15 causes a corresponding upward movement of piston 14.

The supply valve 21 is thus opened at each front wheel, so as to admit fluid under pressure from the reservoir 24 to the brake chamber 3 at each front wheel.

When the pressure of fluid in chamber 27 slightly exceeds the pressure of spring 15, the piston 14 is moved so as to permit the supply valve 21 to seat and thus cut off the further supply of fluid under pressure to the brake chamber. It will be seen that the braking pressure at each front wheel is proportional to the load on each wheel, and the corresponding compression of the spring 11. It will also be evident that in any event, the pressure of fluid supplied to the brake chambers at the front wheels cannot exceed that supplied to the brake chamber at the rear wheel, since the source of fluid pressure for the front wheel is the reservoir 24, which is charged only to the pressure of fluid admitted to the brake chamber 3' at the rear wheel.

Should the front wheels hit the ground before the rear wheel, the pressure will be limited to the pressure initially supplied to the rear wheel brake chamber and no higher pressure can be applied to the front wheels until the rear wheel hits the ground.

If the rear wheel should rebound off the ground, or should the pressure of the airplane body on the wheel be otherwise relieved, the spring 11' of the rear wheel valve device will be permitted to expand a corresponding amount, and thereby the member 16' will be permitted to move so as to relieve the pressure on spring 15'. As a consequence, the piston 14' of the controlling valve device at the rear wheel will be moved downwardly by the pressure of fluid acting in chamber 27' and the exhaust valve 22' will be unseated. Fluid under pressure is then released from the brake chamber 3' at the rear wheel and from the reservoir 24 until the pressure in chamber 27' has been reduced to a degree slightly less than the reduced pressure of spring 15', when the piston 14' will move up to seat against the valve 22' and thus cut off the further exhaust of fluid from the rear wheel brake chamber.

After the airplane has been brought to rest on the ground, the brakes may be released by operating the brake valve device 29, so as to vent fluid from the pipe 26. Fluid under pressure is then vented from the brake chamber 3' at the rear wheel by way of pipe 23, chamber 27', and past the ball check valve 33' to pipe 26. Fluid under pressure is also vented from the reservoir 24, by way of pipe 23, and consequently from the brake chambers 3 at the front wheels, by way of pipes 25, chambers 27, past check valves 33 to pipe 32.

In the same way as described in connection with the rear wheel, if either front wheel should leave the ground, the controlling valve device will operate to automatically release fluid under pressure from the corresponding brake chamber.

With my invention, it will be seen that the brake is applied to each landing wheel of the airplane in direct proportion to the load exerted on each wheel, but that at no time can the braking pressure at the front wheels exceed the braking pressure exerted at the rear wheel.

Should the load on any wheel decrease after coming in contact with the ground, any excessive braking pressure will be automatically released, locally at the front wheels, and from all three wheels by way of the rear wheel controlling valve device.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a rear landing wheel and front landing wheels for an airplane, of a fluid pressure brake device associated with each landing wheel, and valve means for individually varying the pressure of fluid on each device in proportion to the load on the corresponding wheel, the valve means on the rear wheel being operative to supply fluid to the front wheel brake devices only upon engagement of the rear wheel with the ground.

2. In an airplane brake, the combination with a rear landing wheel and front landing wheels, of a brake device associated with each wheel, the front wheel valve device being operative upon engagement of the front wheels with the ground to apply the brakes, and means for preventing an application of the brakes at the front wheels unless the brake has been applied at the rear wheel.

3. In an airplane brake, the combination with a rear landing wheel and front landing wheels, of a fluid pressure brake device associated with the front landing wheel and operative to apply the brakes upon engagement of the front wheels with the ground, and valve means associated with the rear wheel for controlling the fluid pressure for operating the front wheel brakes.

4. In an airplane brake, the combination with a rear landing wheel and front landing wheels, of a fluid pressure brake device associated with each wheel, a reservoir from which fluid under pressure is supplied for operating the front wheel brakes, and means controlled by the fluid pressure brake device associated with the rear wheel for controlling the supply of fluid under pressure to said reservoir.

5. In an airplane brake, the combination with a rear landing wheel and front landing wheels, of a fluid pressure brake device associated with each wheel, a reservoir from which fluid under pressure is supplied for operating the front wheel brakes, and means operated upon applying the brake on the rear wheel for supplying fluid under pressure to said reservoir.

6. In an airplane brake, the combination with a rear landing wheel and front landing wheels and a fluid pressure brake device associated with each wheel, of valve means associated with each brake device, said valve means associated with the rear landing wheel being operated upon engagement of the rear landing wheel with the ground for supplying fluid under pressure to the corresponding brake device and to the brake devices on the front wheels and operative upon the rear wheel leaving the ground for releasing fluid under pressure from said brake devices.

7. In an airplane brake, the combination with a rear landing wheel and front landing wheels and a fluid pressure brake device associated with each wheel, of valve means associated with each brake device, said valve means associated with the rear wheel being operated automatically upon an increase in the load on the rear landing wheel for supplying fluid under pressure to the corresponding brake device and to the valve means associated with the front wheels to effect their operation to vary the braking pressure in proportion to the load on the wheels and said valve means associated with said rear wheel being operated upon the raising of the rear wheel from the ground to release fluid under pressure from said devices.

8. The combination with a rear landing wheel and front landing wheels for an airplane, of a fluid pressure brake device associated with each landing wheel, a valve device associated with each brake device, said valve devices being operable to supply fluid pressure to said brake devices, and said valve means on the rear wheel being controlled by the load on the rear wheel for operating said rear wheel valve device to supply fluid to each of said brake devices when said rear wheel is under load and to release fluid under pressure from said brake devices upon the release of load on said rear wheel.

9. The combination with landing wheels for an airplane, of a fluid pressure brake device associated with a landing wheel, valve means for controlling the supply and release of fluid under pressure to and from said brake device, a spring subject to the load on the landing wheel, and a piston subject to the pressure of said spring for operating said valve means to supply and release fluid to and from said brake device.

10. The combination with landing wheels for an airplane, of a fluid pressure brake device associated with a landing wheel, valve means for controlling the supply and release of fluid under pressure to and from said brake device, a spring subject to the load on the landing wheel, and a piston subject to the opposing pressures of said spring and the pressure of fluid supplied to said brake device for controlling said valve means.

11. The combination with a rear landing wheel and front landing wheels for an airplane, of means for manually applying the brake at the rear wheel, and valve means for automatically applying the brakes on each of the front wheels independently and in proportion to the load sustained by the wheel with which said brake device is associated upon engagement of the front wheels with the ground.

12. The combination with a rear landing wheel and front landing wheels for an airplane, of a fluid pressure controlled brake device for each landing wheel, manually operated means for supplying fluid under pressure to the rear landing wheel brake device, and automatically operated valve means for supplying fluid under pressure to the front landing wheel brake devices upon the front landing wheels hitting the ground to energize said brake devices independently and in proportion to the load sustained by the wheel with which said brake device is associated.

13. The combination with a rear landing wheel and front landing wheels for an airplane, of a fluid pressure controlled brake device for each wheel, a normally open valve for controlling the supply of fluid under pressure to the rear wheel brake device, a normally closed valve for controlling the supply of fluid under pressure to each front wheel brake device, and means for opening the normally closed valves upon engagement of the front wheels with the ground.

14. The combination with a rear landing wheel and front landing wheels for an airplane, of a fluid pressure brake device associated with each wheel, valve means associated with each brake device, the valve means on said rear wheel operating to control the supply of fluid under pressure to the valve means associated with the front wheel brake devices to render them operative to vary the braking power on the wheels in proportion to the load on the wheels only upon engagement of the rear wheel with the ground.

15. The combination with a rear landing wheel and front landing wheels for an airplane, of a fluid pressure brake device associated with each wheel, valve means associated with each brake device, the valve means on said rear wheel operating to prevent the supply of fluid under pressure to the front wheel brake devices to vary the braking power on the wheels in proportion to the load wheel on each wheel until the rear wheel engages the ground.

In testimony whereof I have hereunto set my hand, this 10th day of November, 1928.

SIDNEY G. DOWN.